United States Patent
Hatch et al.

(10) Patent No.: US 8,872,509 B2
(45) Date of Patent: Oct. 28, 2014

(54) REDUCING ANGULAR CLEARANCE BETWEEN A MOTOR SHAFT AND AN ANGULAR POSITION SENSOR

(75) Inventors: Erik Christopher Hatch, Cypress, CA (US); Peter Bostwick, Rochester, MI (US); Brandon Given, Rochester Hills, MI (US); Dang Dinh Dang, Garden Grove, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 279 days.

(21) Appl. No.: 13/218,191

(22) Filed: Aug. 25, 2011

(65) Prior Publication Data

US 2013/0049552 A1 Feb. 28, 2013

(51) Int. Cl.
*H02K 11/00* (2006.01)

(52) U.S. Cl.
CPC ................................. *H02K 11/0015* (2013.01)
USPC ................................. 324/207.21; 324/207.25

(58) Field of Classification Search
USPC .......................... 324/765.01, 207.11–207.26; 403/355–357; 464/74
See application file for complete search history.

(56) References Cited

U.S. PATENT DOCUMENTS

| | | | | |
|---|---|---|---|---|
| 4,576,504 A | * | 3/1986 | Hartman | 403/318 |
| 4,678,162 A | * | 7/1987 | Yang | 254/8 B |
| 6,213,906 B1 | * | 4/2001 | Codatto | 475/178 |
| 2002/0109500 A1 | | 8/2002 | Schroeder et al. | |
| 2008/0284268 A1 | * | 11/2008 | Yuratich et al. | 310/156.09 |
| 2011/0101809 A1 | * | 5/2011 | Weber | 310/91 |

FOREIGN PATENT DOCUMENTS

| | | |
|---|---|---|
| CN | 2284157 Y | 6/1998 |
| CN | 1941561 A | 4/2007 |
| CN | 101630888 A | 1/2010 |
| CN | 201678012 U | 12/2010 |
| CN | 102066723 A | 5/2011 |
| JP | 2002027688 A | 1/2002 |
| JP | 2005160161 A | 6/2005 |

OTHER PUBLICATIONS

State Intellectual Property Office of the Peoples' Republic of China, Office Action for Chinese Patent Application No. 201210304403.6, mailed May 30, 2014.

\* cited by examiner

*Primary Examiner* — Arleen M Vazquez
*Assistant Examiner* — Brent J Andrews
(74) *Attorney, Agent, or Firm* — Ingrassia Fisher & Lorenz, P.C.

(57) ABSTRACT

An electric motor assembly includes a motor shaft rotatable about a longitudinal axis, an angular position sensor rotor, and a deformable pin. The motor shaft has an axial keyway formed therein, and the axial keyway has a nominal keyway dimension. The angular position sensor rotor is coupled to the motor shaft to rotate with the motor shaft. The angular position sensor rotor has an axial key to fit within the axial keyway of the motor shaft, and the axial key has a nominal key dimension that is less than the nominal keyway dimension. The deformable pin is located in the axial keyway under compression between the axial key and the motor shaft to inhibit rotational shifting of the angular position sensor rotor relative to the motor shaft.

6 Claims, 5 Drawing Sheets

REDUCING ANGULAR CLEARANCE BETWEEN A MOTOR SHAFT AND AN ANGULAR POSITION SENSOR

TECHNICAL FIELD

Embodiments of the subject matter described herein relate generally to electric motor assemblies. More particularly, embodiments of the subject matter relate to a technique for reducing or eliminating angular position sensor errors caused by rotor movement due to clearances between an angular position sensor rotor and a shaft or hub.

BACKGROUND

In recent years, advances in technology, as well as ever evolving tastes in style, have led to substantial changes in the design of automobiles. One of the changes involves the power usage and complexity of the various electrical systems within automobiles, particularly alternative fuel vehicles, such as hybrid, electric, and fuel cell vehicles.

Many of the electrical components, including the electric traction motors used in electric and hybrid electric vehicles, receive electrical power from alternating current (AC) power supplies. However, the power sources (e.g., batteries) used in such applications provide only direct current (DC) power. Thus, devices known as power inverters are used to convert the DC power to AC power. Such power inverters are typically controlled using one or more feedback mechanisms, which may rely on real-time operating data including vehicle status data, vehicle throttle data, and motor position data.

Motor position data may include the current angular position of the rotor. The angular position sensor includes a rotor and a stator. The angular position sensor rotor is mounted to the electric traction motor rotor. The angular position sensor stator is mounted to a stationary support member within the electric traction motor assembly. The angular position sensor functions by the interaction of the input exciting voltage supplied to the angular position sensor and magnetic features on the angular position sensor rotor, and results in an output signal that indicates the absolute position of the electric traction motor rotor. Ideally, the sensor rotor remains stationary and fixed relative to the motor shaft. In practice, however, fabrication tolerances, manufacturing techniques, thermal cycling, and normal wear and tear can result in some movement of the sensor rotor relative to the motor shaft. Movement of the sensor rotor relative to the motor shaft can lead to sensor data errors, which are exacerbated in multi-pole motors (where a single mechanical rotation corresponds to multiple electrical rotations, which in turn multiplies the effect of sensor data errors).

BRIEF SUMMARY

An exemplary embodiment of an electric motor assembly is presented here. The electric motor assembly includes: a motor shaft rotatable about a longitudinal axis, the motor shaft having an axial keyway formed therein, and the axial keyway having a nominal keyway dimension; an angular position sensor rotor coupled to the motor shaft to rotate with the motor shaft, the angular position sensor rotor having an axial key to fit within the axial keyway of the motor shaft, and the axial key having a nominal key dimension that is less than the nominal keyway dimension; and a deformable pin located in the axial keyway and under compression between the axial key and the keyway in the motor shaft, the deformable pin inhibiting rotational shifting of the angular position sensor rotor relative to the motor shaft.

Also provided is an exemplary embodiment of a method of manufacturing an electric traction motor assembly of a vehicle. The method couples an angular position sensor rotor to a motor shaft that is rotatable about a longitudinal axis, the motor shaft having an axial keyway formed therein, and the angular position sensor rotor having an axial key. The coupling results in the axial key residing within the axial keyway. The method continues by introducing a deformable pin into a clearance space within the axial keyway between the axial key and the motor shaft. The deformable pin is then inserted into the axial keyway to at least partially fill the clearance space and to inhibit rotation of the angular position sensor rotor relative to the motor shaft.

An exemplary embodiment of a method of manufacturing an electric traction motor assembly of a vehicle is also provided. The method begins by providing an angular position sensor rotor with an axial key having a nominal key width, and providing an electric traction motor with a motor shaft rotatable about a longitudinal axis. The motor shaft has an axial keyway formed therein, and the axial keyway has a nominal keyway width that is greater than the nominal key width. The method continues by installing the angular position sensor rotor onto the motor shaft such that the axial key resides within the axial keyway with clearance space between the axial key and the motor shaft due to a difference between the nominal key width and the nominal keyway width. The method continues by at least partially filling the clearance space to inhibit movement of the angular position sensor rotor relative to the motor shaft.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1:
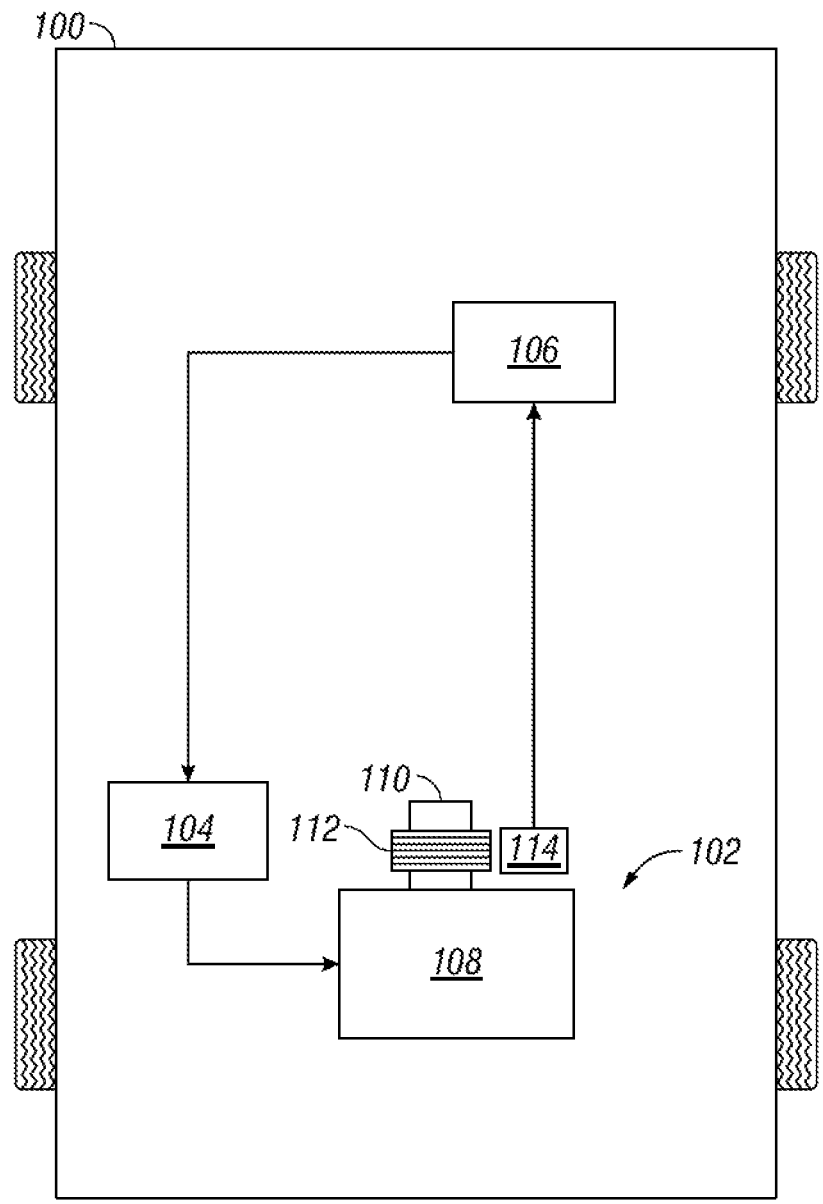
FIG. 1 is a simplified schematic representation of a vehicle having an electric traction system.

The subject matter described here can be utilized with rotating machinery such as electric motors of the type found in vehicles. For example, the subject matter presented here can be used in an electric traction motor of an electric or hybrid automobile. In this regard, FIG. 1 is a simplified schematic representation of a vehicle 100 having an electric traction system. An embodiment of the electric traction system includes, without limitation: an electric motor assembly 102; an inverter system 104; and a motor controller 106. The electric motor assembly 102 includes, without limitation: an electric motor 108 having a motor shaft 110; an angular position sensor rotor 112 coupled to the motor shaft 110; and a sensor module 114 associated with the angular position sensor rotor 112. The sensor module 114 is schematically depicted in FIG. 1. In practice, the sensor module 114 is designed to encircle the angular position sensor rotor 112. In this regard, the angular position sensor rotor 112 and the sensor module 114 may resemble two coaxial cylinders.

The components depicted in FIG. 1 cooperate in a well known manner to control and regulate the electric motor 108 for purposes of providing torque to the traction wheels of the vehicle. The motor controller 106 controls the operation of the inverter system 104, which converts energy from one or more direct current energy sources (not shown) into alternating current energy for driving the electric motor 108 or can also convert AC to DC when the electric machine is operating as a generator. During operation of the electric motor 108, the motor shaft 110 rotates about its longitudinal axis. The angular position sensor rotor 112 is coupled to the motor shaft 110 such that rotation of the motor shaft 110 results in rotation of the angular position sensor rotor 112. Ideally, the angular position sensor rotor 112 is stationary with respect to the motor shaft 110 such that the angular position sensor rotor 112 does not rotate relative to the motor shaft 110.

The motor controller 106 is in communication with the angular position sensor rotor 112. In certain embodiments (such as the one depicted in FIG. 1), the motor controller 106 communicates with the angular position sensor rotor 112 via the sensor module 114. In practice, the sensor module 114 detects position of the angular position sensor rotor 112 and provides angular position data or signals to the motor controller 106 for processing and analysis. In turn, the motor controller 106 utilizes the sensor data from the angular position sensor rotor 112 to determine how best to control the inverter system 104. Of course, the operation of the motor controller 106 can be influenced by other data collected by any number of onboard systems, as is well understood.

Figure 2:
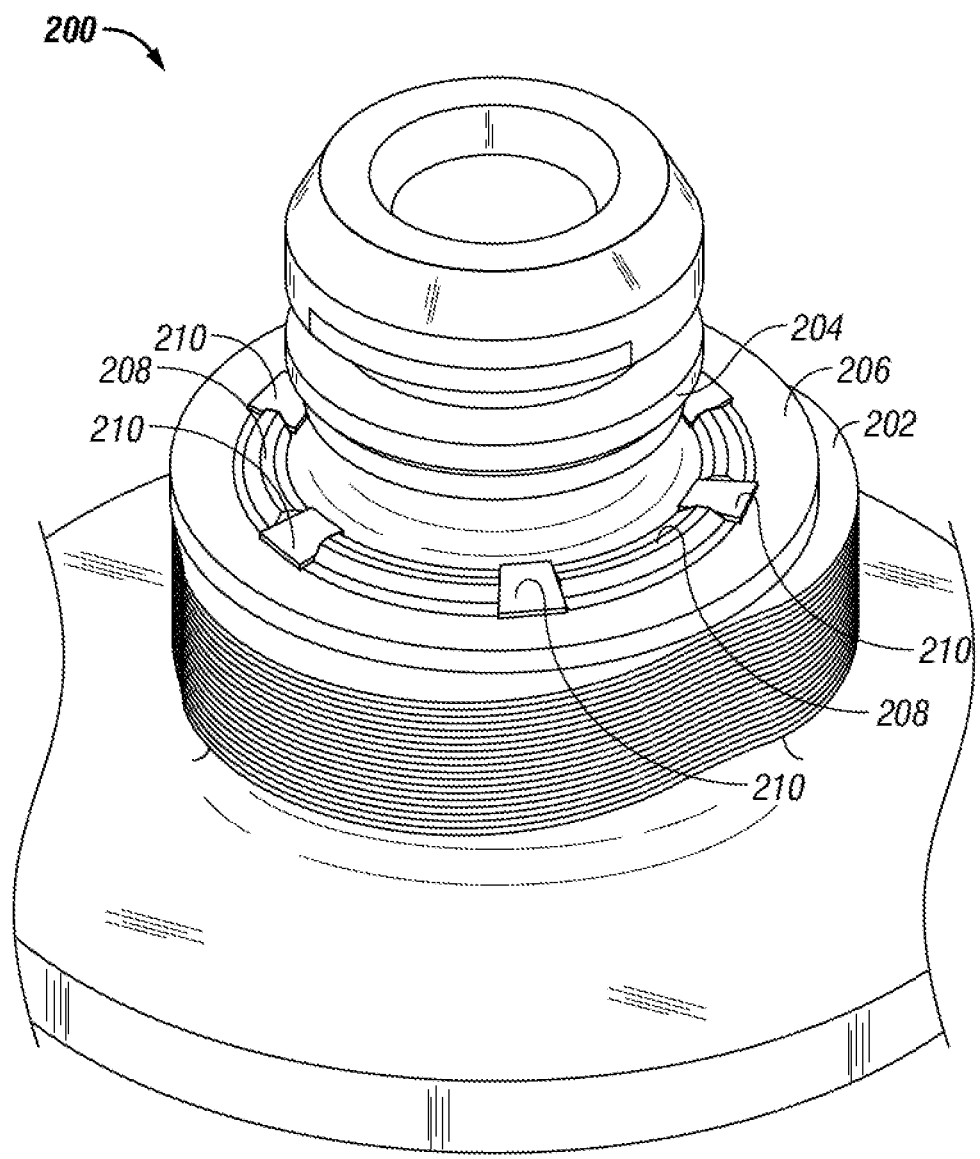
FIG. 2 is a perspective view of an electric motor assembly having an angular position sensor rotor affixed to a motor shaft.

Due to manufacturing tolerances, assembly variances, and/or other factors, the angular position sensor rotor 112 may not be completely fixed relative to the motor shaft 110. In other words, there may be a small amount of "play" or "slop" that allows the angular position sensor rotor 112 to rotate slightly relative to the motor shaft 110. Relative movement of the angular position sensor rotor 112 can be reduced or eliminated by mechanically fixing the angular position sensor rotor 112 to the motor shaft 110. In this regard, FIG. 2 is a perspective view of an electric motor assembly having an angular position sensor rotor 202 affixed to a motor shaft 204. The angular position sensor rotor 202 is secured to the motor shaft 204 by way of a swedging technique. As depicted in FIG. 2, the angular position sensor rotor 202 is installed around the motor shaft rotor 204, and a metal washer 206 is installed overlying the angular position sensor rotor 202. Thereafter, a pliable rim 208 formed on the motor shaft 204 is deformed to create a plurality of tabs 210 that engage the upper surface of the washer 206. This approach can be effective for embodiments that employ a machined motor shaft 204 fabricated out of a pliable metal that can withstand the swedging procedure that creates the tabs 210. Unfortunately, the swedging technique is not suitable for motor shafts, hubs, or similar components that are fabricated from tough or brittle materials (such as cast iron, which is preferred for high volume and low cost manufacturing). Accordingly, an alternate approach is desirable for low cost applications that utilize cast metals and/or other brittle materials for the motor shaft.

Figure 3:
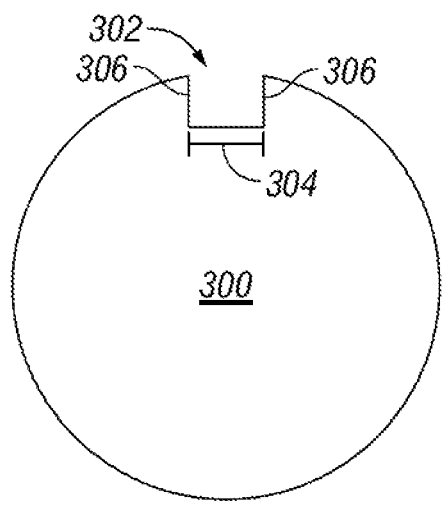
FIG. 3 is an end view (or, equivalently, a longitudinal cross-sectional view) of an electric motor shaft.
Figure 4:
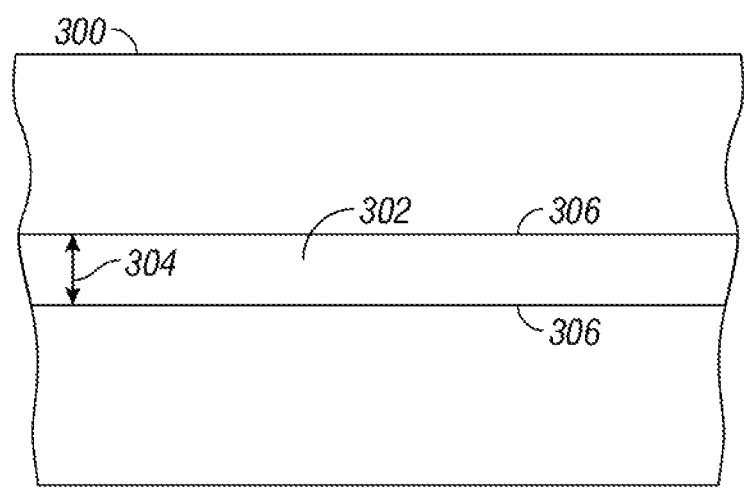
FIG. 4 is a top view of the electric motor shaft shown in FIG. 3.

FIG. 3 is an end view (or, equivalently, a longitudinal cross-sectional view) of an electric motor shaft 300. The motor shaft 300 is rotatable about its longitudinal axis (in FIG. 3, the longitudinal axis runs in and out of the page). The motor shaft 300 has a generally circular cross section, and it may be solid (as shown) or hollow. The motor shaft 300 is designed to accommodate existing angular position sensor configurations that employ a key feature. To this end, the motor shaft 300 includes an axial keyway 302 formed therein. FIG. 4 is a top view of the motor shaft 300, depicting the longitudinal dimension of the axial keyway 302. For the illustrated embodiment, the axial keyway 302 is formed as a cavity or recess in an outer surface of the motor shaft 300 such that the angular position sensor rotor can be installed over and around the motor shaft 300. In alternate embodiments (not shown), an axial keyway is formed in an inner diameter surface of a hollow motor shaft, such that the angular position sensor rotor can be installed within a longitudinal cavity formed in the motor shaft.

The cross section of the axial keyway 302 may be rectangular (as shown), circular, triangular, elliptical, etc. Indeed, the technique and technology described here can be applied to keys and keyway features having any suitable cross sectional shape. The axial keyway 302 has a nominal keyway dimension (e.g., the width 304). The width 304 of the axial keyway 302 is defined between the two interior sidewalls 306 of the axial keyway 302. The width 304 is intentionally oversized relative to the mating key feature of the angular position sensor rotor for reasons that will become apparent from the following description.

A method of manufacturing an electric traction motor assembly of a vehicle will now be described with reference to FIGS. 3-9. The assembly method assumes that an electric traction motor having the motor shaft 300 and an appropriately shaped and sized axial keyway 302 has already been fabricated and provided. The assembly method also assumes that a corresponding angular position sensor has already been provided in a ready-to-assemble state.

Figure 5:
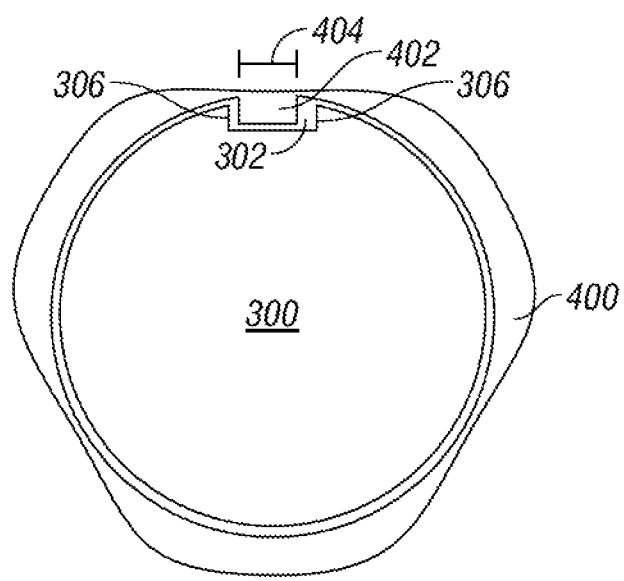
FIG. 5 is a cross-sectional view of an electric motor assembly that includes the motor shaft shown in FIG. 3 with an angular position sensor rotor installed thereon.

The manufacturing process may begin by coupling the angular position sensor rotor 400 to the motor shaft 300 (see FIG. 5). As shown in FIG. 5, the angular position sensor rotor 400 has an axial key 402 that is shaped and sized to fit within the axial keyway 302 of the motor shaft 300. For this exemplary embodiment, the axial key 402 protrudes from an inner surface of the angular position sensor rotor 400, as shown in FIG. 5. Accordingly, the angular position sensor rotor 400 can be installed onto the motor shaft 300 by aligning the axial key 402 with the axial keyway 302 and sliding the angular position sensor rotor 400 into place. FIG. 5 shows an amount of circumferential clearance in an exaggerated manner for ease of illustration. The engagement of the axial key 402 in the axial keyway 302 maintains the angular position sensor rotor 400 in place such that it rotates with the motor shaft 300.

The axial key 402 has a nominal key dimension (e.g., the width 404 defined between its two exterior sidewalls) that is less than the nominal keyway dimension (e.g., the width 304). Indeed, the motor shaft 300 may be fabricated with a specified width 304 that is influenced by and dependent on the width 404 of the axial key 402. In other words, the size of the axial keyway 302 is intentionally designed to be larger than the size of the axial key 402 (the size of the axial key 402 might be obtained from the manufacturer or vendor of the angular position sensor rotor 400 to accommodate the design and fabrication of the motor shaft 300). In some exemplary embodiments, the nominal width 304 of the axial keyway is about 5.5 to 9.0 mm, and the nominal width 404 of the axial key is about 4.0 to 6.0 mm.

As shown in an exaggerated manner in FIG. 5, the intentionally oversized axial keyway 302 easily accommodates the axial key 402 such that the axial key 402 resides within the axial keyway 302 with an intentional amount of clearance space between axial key 402 and one or both of the interior sidewalls 306 of the motor shaft 300. The clearance space results from the difference between the nominal width 304 of the axial keyway 302 and the nominal width 404 of the axial key 402.

Figure 6:
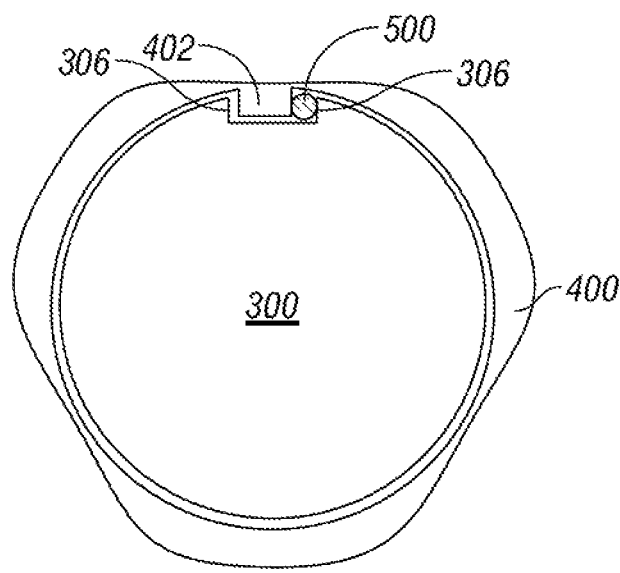
FIG. 6 is a cross-sectional view of the electric motor assembly shown in FIG. 5 after a deformable pin has been introduced.
Figure 7:
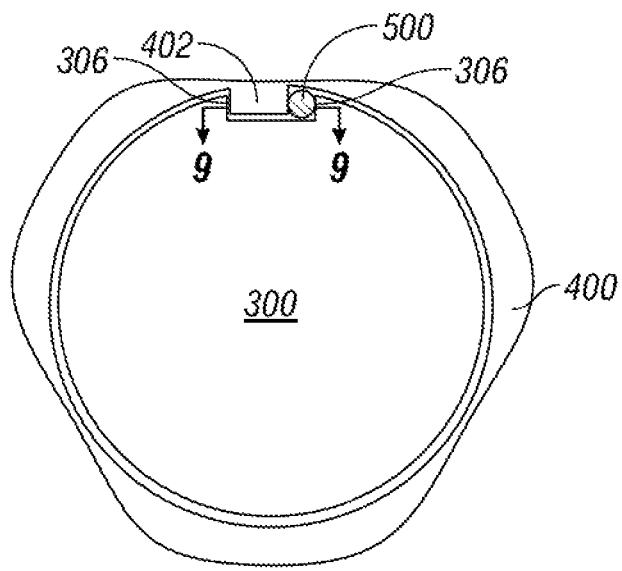
FIG. 7 is a cross-sectional view of the electric motor assembly shown in FIG. 6 after installation of the deformable pin.

The assembly process may continue by at least partially filling the clearance space to inhibit movement of the angular position sensor rotor 400 relative to the motor shaft 300. In practice, the clearance space could be filled with a suitable material, component, device, or the like. For this particular embodiment, the clearance space is at least partially filled by inserting a deformable pin 500 into the axial keyway 302. FIG. 6 is a cross-sectional view of the electric motor assembly after the deformable pin 500 has been introduced into the clearance space, and FIG. 7 shows the electric motor assembly after installation of the deformable pin 500. The deformable pin 500 may be realized as a roll pin, a spring pin, or any compressible pin formed from a strong yet deformable material such as spring steel, stainless steel, or the like. Prior to insertion, the deformable pin 500 may have a tapered tip that facilitates entry and installation into the clearance space.

Figure 8:
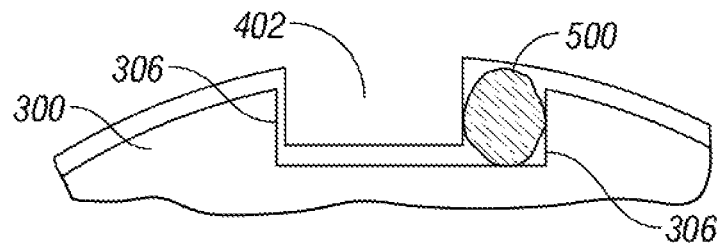
FIG. 8 is a detailed view of a portion of the electric motor assembly shown in FIG. 7.

For this particular embodiment, the deformable pin 500 is inserted into the clearance cavity by a press fitting operation, by impact, by clamping, or the like. Installation of the deformable pin 500 forces the axial key 402 against one of the interior sidewalls 306 of the motor shaft 300, as schematically depicted in FIG. 7. When installed, the deformable pin 500 is compressed between one of the interior sidewalls 306 and one of the exterior sidewalls of the axial key 402. This establishes an interference fit between the axial key 402 and the motor shaft 300, such that the deformable pin 500 inhibits rotational shifting of the angular position sensor rotor 400 relative to the motor shaft 300. As shown in FIG. 8, press fitting the deformable pin 500 in this manner may deform and compress the deformable pin 500 such that it occupies the clearance space while forcing the axial key 402 against the interior sidewall 306 of the motor shaft 300.

Notably, the axial keyway 302, the axial key 402, and the deformable pin 500 are cooperatively configured to reduce or minimize circumferential and radial stress imparted to the angular position sensor rotor 400 by the deformable pin 500. Circumferential and radial stress (e.g., hoop stress) could introduce error in the sensor data generated by the angular position sensor rotor 400 and, therefore, circumferential and radial stress should be avoided. The deformable pin 500 fixes the rotational position of the angular position sensor rotor 400 in a way that imparts some lateral stress to the sidewall of the axial key 402, but in a way that imparts little to no circumferential stress to the body of the angular position sensor rotor 400. Rather, the stress is applied across the key 402, which is outside the electromagnetic path, so stress across the key 402 does not impact performance. Moreover, the amount of resulting stress is relatively low when assembling in this manner.

Figure 9:
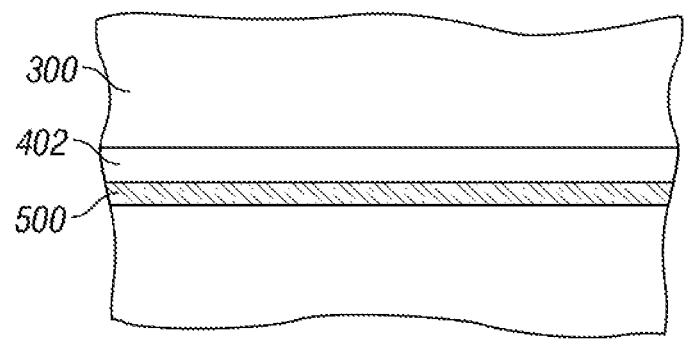
FIG. 9 is a cross-sectional view of a portion of the electric motor assembly, as viewed along line 9-9 of FIG. 7.

FIG. 9 is a cross-sectional view of a portion of the electric motor assembly, as viewed along line 9-9 of FIG. 7. FIG. 9 illustrates how the deformable pin 500 is positioned in the longitudinal (axial) dimension of the motor shaft 300. In practice, the axial length of the deformable pin 500 may exceed the axial length of the angular position sensor rotor 400. In such an implementation the end of the deformable pin 500 may extend into a hole or a cavity formed in a base or a shoulder of the motor shaft 300. In alternate embodiments, the axial length of the deformable pin 500 may be less than or equal to the axial length of the angular position sensor rotor.

After the deformable pin 500 has been installed in the axial keyway 302, fabrication of the electric motor assembly may be completed in an appropriate manner and in accordance with conventional manufacturing techniques. For example, the electric motor assembly could be installed into a host vehicle and prepared for the necessary electrical connections to an inverter system, a motor controller, and the like (see FIG. 1).

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An electric motor assembly comprising:
    a motor shaft rotatable about a longitudinal axis, the motor shaft having an axial keyway formed therein, and the axial keyway having a nominal keyway dimension corresponding to a keyway width defined between interior sidewalls of the keyway;
    an angular position sensor rotor coupled to the motor shaft to rotate with the motor shaft, the angular position sensor rotor having an axial key to fit within the axial keyway of the motor shaft, and the axial key having a nominal key dimension that is less than the nominal keyway dimension, the nominal key dimension corresponding to a key width defined between exterior sidewalls of the axial key; and
    a deformable pin located in the axial keyway and under compression between the axial key and the axial keyway of the motor shaft, the deformable pin inhibiting rotational shifting of the angular position sensor rotor relative to the motor shaft, wherein the deformable pin is compressed between one of the interior sidewalls of the keyway and one of the exterior sidewalls of the axial key.

2. The electric motor assembly of claim 1, wherein the deformable pin is a roll pin.

3. The electric motor assembly of claim 1, wherein the deformable pin is a spring pin.

4. The electric motor assembly of claim 1, wherein:
the axial keyway is formed in an outer surface of the motor shaft;
the angular position sensor rotor is coupled around the outer surface of the motor shaft; and
the axial key protrudes from an inner surface of the angular position sensor rotor.

5. The electric motor assembly of claim 1, wherein the axial keyway, the axial key, and the deformable pin are cooperatively configured to minimize circumferential stress imparted to the angular position sensor rotor by the deformable pin.

6. The electric motor assembly of claim 1, further comprising a motor controller in communication with the angular position sensor rotor to control operation of an electric motor that includes the motor shaft.

\* \* \* \* \*